US010781767B2

(12) United States Patent
Toda et al.

(10) Patent No.: US 10,781,767 B2
(45) Date of Patent: Sep. 22, 2020

(54) FUEL INJECTION CONTROL APPARATUS FOR INTERNAL COMBUSTION ENGINE

(71) Applicant: MITSUBISHI JIDOSHA KOGYO KABUSHIKI KAISHA, Tokyo (JP)

(72) Inventors: Hitoshi Toda, Tokyo (JP); Toshiyuki Miyata, Tokyo (JP); Katsunori Ueda, Tokyo (JP); Takahiro Tsutsui, Tokyo (JP)

(73) Assignee: MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/193,094

(22) Filed: Nov. 16, 2018

(65) Prior Publication Data

US 2019/0153973 A1 May 23, 2019

(30) Foreign Application Priority Data

Nov. 17, 2017 (JP) .................................. 2017-222035

(51) Int. Cl.
*F02D 41/30* (2006.01)
*F02D 41/14* (2006.01)
(Continued)

(52) U.S. Cl.
CPC ....... *F02D 41/3094* (2013.01); *F02D 41/047* (2013.01); *F02D 2041/1433* (2013.01); *F02D 2041/389* (2013.01)

(58) Field of Classification Search
CPC .. F02D 41/3094; F02D 41/047; F02D 41/402; F02D 41/403; F02D 41/405; F02D 2041/1433; F02D 2041/389; F02M 69/046

See application file for complete search history.

(56) References Cited

U.S. PATENT DOCUMENTS

2015/0240737 A1* 8/2015 Surnilla ................ F02D 41/008
                                                          123/435
2015/0240740 A1* 8/2015 Toda ................... F02D 41/3094
                                                          123/445
(Continued)

FOREIGN PATENT DOCUMENTS

DE    102015108451 A1   12/2015
DE    102015223862 A1   6/2017
(Continued)

OTHER PUBLICATIONS

Extended European Search Report, dated Apr. 29, 2019, for European Application No. 18205879.2.

*Primary Examiner* — George C Jin
(74) *Attorney, Agent, or Firm* — Birch, Stewart, Kolasch & Birch, LLP

(57) ABSTRACT

A fuel injection control apparatus switches between MPI and DI+MPI modes. The apparatus includes a unit calculating a DI direct combustion rate that is the rate of that portion of the amount of DI injection corresponding to a fuel combusted instead of adhering to inside of the cylinder, and a unit calculating a cylinder vaporization rate that is the rate of the amount of that portion of the fuel adhering to the inside of the cylinder which vaporizes. The former unit controls fuel injection based at least on the DI direct combustion rate and the cylinder vaporization rate. When the mode is switched between the MPI mode and the DI+MPI mode, the former unit corrects the DI direct combustion rate or the cylinder vaporization rate to set the amount of fuel injection to a value different from that set when the fuel injection modes are maintained.

5 Claims, 5 Drawing Sheets

(51) Int. Cl.
  *F02D 41/04*    (2006.01)
  *F02D 41/38*    (2006.01)

(56) References Cited

U.S. PATENT DOCUMENTS

| | | |
|---|---|---|
| 2015/0345407 A1 | 12/2015 | Glugla et al. |
| 2015/0369162 A1* | 12/2015 | Cohn .................. F02D 13/0215 |
| | | 123/406.27 |
| 2016/0131051 A1* | 5/2016 | Matsunaga ......... F02D 41/3094 |
| | | 60/603 |

FOREIGN PATENT DOCUMENTS

| | | |
|---|---|---|
| EP | 1900929 A2 | 3/2008 |
| EP | 3361074 A1 | 8/2018 |
| JP | 2006-63947 A | 3/2006 |
| JP | 2007-247454 A | 9/2007 |
| JP | 2015-158180 A | 9/2015 |

* cited by examiner

FUEL INJECTION CONTROL APPARATUS FOR INTERNAL COMBUSTION ENGINE

BACKGROUND OF THE INVENTION

Field of the Invention

The present invention relates to a fuel injection control apparatus for an internal combustion engine, and in particular, to fuel injection control in an internal combustion engine capable of providing intake passage injection and cylinder injection.

Description of the Related Art

A dual-injector engine is a known engine (internal combustion engine) mounted in an automobile or the like. The dual-injector engine includes a cylinder injection valve injecting a high-pressure fuel into a cylinder (into a combustion chamber) and an intake passage injection valve injecting, into an intake passage such as an intake port, a fuel exerting a pressure relatively lower than the pressure in the cylinder injection. The dual-injector engine switches between the cylinder injection valve and the intake passage injection valve according to an operating state of the engine to achieve satisfactory fuel supply all over the operating range of the engine.

In the engine including the intake passage injection valve, a portion of the fuel injected into the intake port through the intake passage injection valve adheres to a surface of an intake valve and a wall surface of the intake port to form a liquid film. The fuel adhering to the surface in liquid film form vaporizes depending on the temperature and pressure of the intake port and is introduced into the cylinder. The amount of fuel introduced into the cylinder may therefore increase or decrease according to temperature relative to the amount of fuel injection through the intake passage injection valve. A technique has thus been proposed that involves estimating the amount of fuel adhering to the intake valve and to the inside of the intake passage such as the intake port and the amount of fuel vaporizing from the intake valve and in the intake passage, to reflect these amounts in the amount of fuel injection through the intake passage injection valve, thus controllably adjusting an air-fuel ratio in the cylinder to a desired value.

Moreover, Japanese Patent Laid-Open No. 2015-158180 proposes a technique for the dual-injector engine as described above that involves estimating not only the amounts of fuel adhering to the inside of the intake port and vaporizing therein but also the amounts of fuel adhering to the inside of the cylinder and vaporizing therein as a result of injection of fuel through the cylinder injection valve, to reflect these amounts in the amounts of fuel injection through the cylinder injection valve and the intake passage injection valve. Specifically, the engine described in Japanese Patent Laid-Open No. 2015-158180 includes a fuel injection mode for both cylinder injection and intake passage injection (DI+MPI mode). This technique involves estimating, in the DI+MPI mode, the amount of fuel adhering to the intake port, the amount of fuel adhering to the inside of the cylinder, the amount of fuel vaporizing in the intake port, and the amount of fuel vaporizing in the cylinder, and with these amounts of fuel adhesion and of fuel vaporization taken into account, setting the amount of fuel injection into the cylinder and the amount of fuel injection into the intake port.

Even when the amounts of fuel adhering to the intake port and to the inside of the cylinder and the amounts of fuel vaporizing from the intake port and in the cylinder are estimated, and based on these amounts, the amount of fuel injection into the cylinder and the amount of fuel injection into the intake port are set, the engine described in the above publication has a disadvantage if the fuel injection mode is switched according to the operating state of the engine. For example, immediately after switching from a fuel injection mode with cylinder fuel injection (DI+MPI mode or DI mode) to a fuel injection mode with no cylinder fuel injection (MPI mode), the cylinder air-fuel ratio may have a value different from a desired value due to a cylinder fuel adhesion state before the switching. This disadvantageously degrades exhaust performance.

SUMMARY OF THE INVENTION

In view of the above-described circumstances, an object of the present invention is to provide a fuel injection control apparatus for an internal combustion engine capable of providing intake passage injection and cylinder injection, the fuel injection control apparatus appropriately controlling a cylinder air-fuel ratio immediately after switching of the ratio between the amounts of fuel injection.

To achieve the object, a fuel injection control apparatus for an internal combustion engine according to the present invention includes a first fuel injection valve injecting a fuel into an intake passage of the internal combustion engine, a second fuel injection valve injecting the fuel into a cylinder of the internal combustion engine, and an injection amount control unit setting a ratio between an amount of fuel injection through the first fuel injection valve and an amount of fuel injection through the second fuel injection valve based on an operating state of the internal combustion engine to control the amounts of fuel injection through the first fuel injection valve and the second fuel injection valve, the injection amount control unit includes a direct-combustion-rate calculation unit calculating a direct combustion rate that is a rate of an amount of that portion of the fuel injected through the second fuel injection valve which is combusted in the cylinder instead of adhering to the inside of the cylinder, and a cylinder vaporization rate calculation unit calculating a cylinder vaporization rate that is a rate of an amount of that portion of the fuel adhering to the inside of the cylinder which vaporizes, and the injection amount control unit sets the amount of fuel injection through the first fuel injection valve and the amount of fuel injection through the second fuel injection valve based at least on the direct combustion rate and the cylinder vaporization rate, and the injection amount control unit corrects the direct combustion rate or the cylinder vaporization rate to set the amount of fuel injection through the first fuel injection valve or the amount of fuel injection through the second fuel injection valve when the ratio between the amount of fuel injection through the first fuel injection valve and the amount of fuel injection through the second fuel injection valve is changed.

If an internal combustion engine enables a change in the ratio between the amount of fuel injection into the cylinder and the amount of fuel injection into the intake passage, then immediately after the change in the ratio between the amounts of fuel injection, the engine is affected by the amount of fuel adhering to the inside of the cylinder until immediately before the change in the ratio. The amount of fuel adhering to the inside of the cylinder or the amount of fuel vaporizing in the cylinder thus varies between a period from the change in the ratio until a predetermined number of injections are provided and a period after the predetermined number of injections have been provided. Therefore, when, immediately after the change in the ratio between the amounts of fuel injection, the direct combustion rate and the cylinder vaporization rate are set to control the amounts of fuel injection through the first fuel injection valve and the second fuel injection valve as is the case where the ratio is maintained instead of being changed, the cylinder air-fuel ratio may temporarily deviate from the desired value.

In the present invention, when the ratio between the amount of fuel injection into the cylinder and the amount of fuel injection into the intake passage is changed, the direct combustion rate or the cylinder vaporization rate is corrected to set the amount of fuel injection through the first fuel injection valve or the amount of fuel injection through the second fuel injection valve. This allows the cylinder air-fuel ratio to be controllably adjusted to the desired value immediately after the change in the ratio between the amounts of fuel injection.

The cylinder air-fuel ratio may therefore be appropriately controlled immediately after the change in the ratio between the amounts of fuel injection, improving exhaust performance.

BRIEF DESCRIPTION OF THE DRAWINGS

The present invention will become more fully understood from the detailed description given hereinafter and the accompanying drawings which are given by way of illustration only, and thus, are not limitative of the present invention, and wherein.

DETAILED DESCRIPTION OF THE INVENTION

An embodiment of the present invention will be described based on the drawings.

Figure 1:
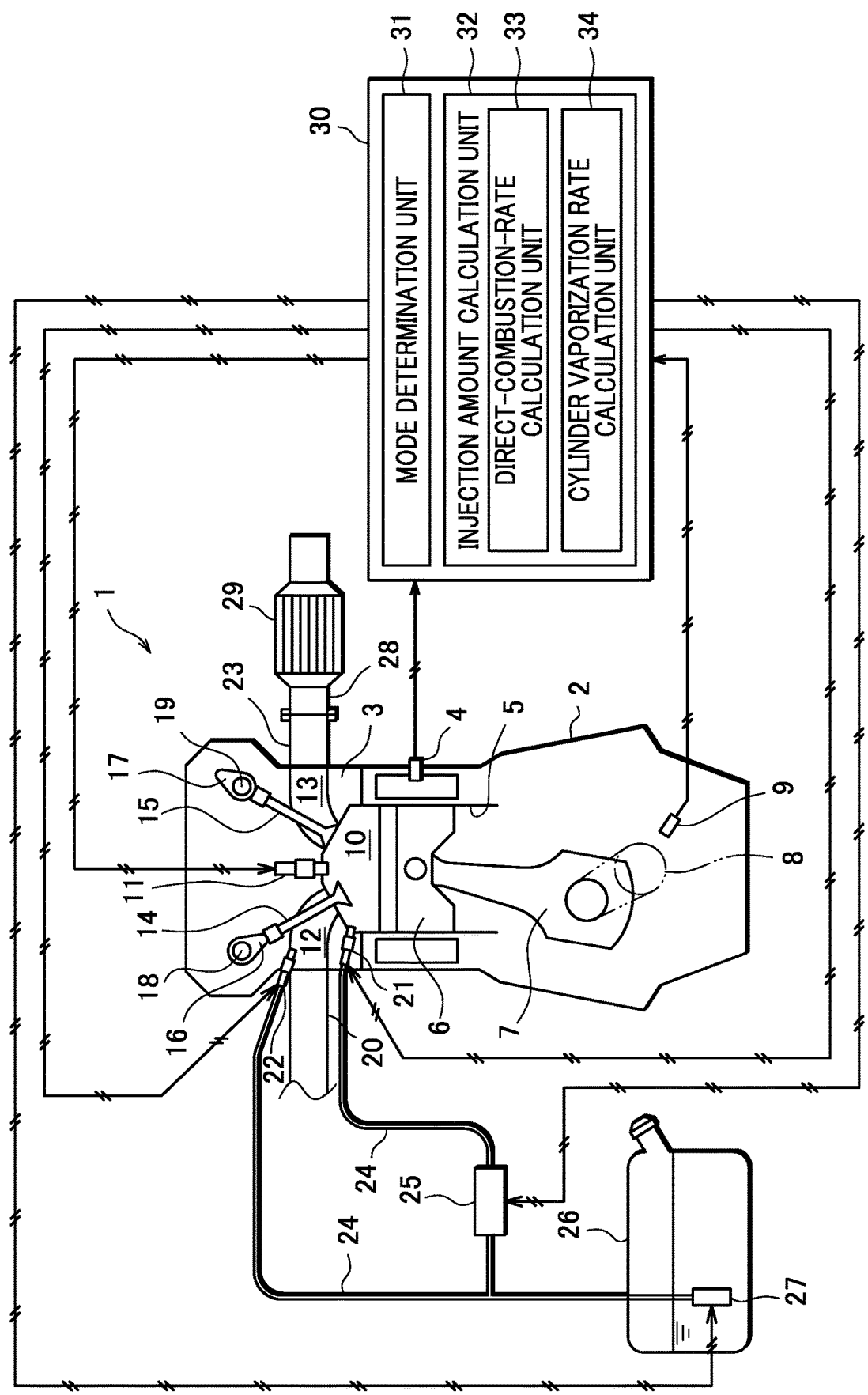
FIG. 1 is a schematic configuration diagram of an engine to which a fuel injection control apparatus for an internal combustion engine according to the present invention is applied.

FIG. 1 is a schematic configuration diagram of an engine 1 (internal combustion engine) to which a fuel injection control apparatus of the present invention is applied.

As illustrated in FIG. 1, the engine 1 is a four-cycle in-line multi-cylinder gasoline engine capable of performing cylinder injection in which a fuel is directly injected into a combustion chamber 10 formed by a cylinder head 3 and a piston 6 (into a cylinder), through a cylinder injection valve (second fuel injection valve) 21 disposed in the cylinder head 3 in such a manner as to face the combustion chamber 10 and port injection in which the fuel is injected into an intake port (intake passage) 12 through an intake passage injection valve 22 (first fuel injection valve) disposed in the cylinder head 3 in such a manner as to face the intake port 12.

FIG. 1 illustrates a longitudinal section of one cylinder of the engine 1. Other cylinders are assumed to have a similar configuration, and illustration and description of the cylinders are omitted.

As illustrated in FIG. 1, the engine 1 includes a cylinder head 3 mounted on a cylinder block 2.

The cylinder block 2 is provided with a water temperature sensor 4 detecting a temperature of cooling water cooling the engine 1. A piston 6 is provided in a cylinder 5 formed in the cylinder block 2 and moves slidably upward and downward. The piston 6 is coupled to a crank shaft 8 via a connecting rod 7. The cylinder block 2 is provided with a crank angle sensor 9 detecting a rotation speed of the engine 1 and a phase of the crank shaft 8. The cylinder head 3, the cylinder 5, and the piston 6 form a combustion chamber 10.

The cylinder head 3 is provided with an ignition plug 11 facing the combustion chamber 10. The cylinder head 3 is also provided with an intake port 12 that extends from the combustion chamber 10 toward one side surface of the cylinder head 3 and an exhaust port 13 that extends from the combustion chamber 10 toward another side surface of the cylinder head 3. The cylinder head 3 is provided with an intake valve 14 that allows and inhibits communication between the combustion chamber 10 and the intake port 12 and an exhaust valve 15 that allows and inhibits communication between the combustion chamber 10 and the exhaust port 13. An upper portion of the cylinder head 3 is provided with an intake cam shaft 18 with an intake cam 16 driving the intake valve 14 and an exhaust cam shaft 19 with an exhaust cam 17 driving the exhaust valve 15. An intake manifold 20 is connected to one side surface of the cylinder head 3 in communication with the intake port 12. A side surface of the cylinder head 3 to which the intake manifold 20 is connected is further provided with a cylinder injection valve 21 that faces the inside of the combustion chamber 10 and an intake passage injection valve 22 that faces the inside of the intake port (intake passage) 12. On the other hand, an exhaust manifold 23 is connected, in communication with the exhaust port 13, to a side surface of the cylinder head 3 opposite to the side surface to which the intake manifold 20 is connected.

The cylinder injection valve 21 connects, via a fuel line 24, to a high-pressure pump 25 feeding a high-pressure fuel and a feed pump 27 feeding a fuel in a fuel tank 26 to the high-pressure pump 25. The cylinder injection valve 21 is configured to inject the high-pressure fuel into the combustion chamber 10.

The intake passage injection valve 22 connects, via the fuel line 24, to the feed pump 27 feeding the fuel in the fuel tank 26. The intake passage injection valve 22 is configured to inject a fuel exerting a relatively low pressure compared to the fuel injected into the intake port (intake passage) 12 through the cylinder injection valve 21.

An intake upstream end of the intake manifold 20 is provided with an intake pipe not illustrated in the drawings and an electronic control throttle valve adjusting the flow rate of intake air and not illustrated in the drawings. The electronic control throttle valve includes a throttle position sensor detecting the degree of opening of the throttle valve and not illustrated in the drawings. An upstream intake pipe of the electronic control throttle valve is provided with an air flow sensor detecting the flow rate of intake air and not illustrated in the drawings. An intake upstream end of the intake pipe is provided with an air cleaner not illustrated in the drawings.

An exhaust downstream end of the exhaust manifold 23 includes an exhaust purification catalyst 29 such as a three-way catalyst via an exhaust pipe (exhaust passage) 28.

Various sensors are electrically connected to an input side of an engine control unit 30 mounted in the vehicle, and include the water temperature sensor 4, the crank angle sensor 9, an intake pressure sensor, the throttle position sensor, the air flow sensor, and a vehicle speed sensor detecting a vehicle speed and not illustrated in the drawings.

The engine control unit 30 includes an input/output device, a storage device (ROM, RAM, nonvolatile RAM, or the like), a timer, and a central processing unit (CPU) to receive detection information from the above-described various sensors and the like.

An output side of the engine control unit 30 electrically connects to various devices such as the ignition plug 11, the cylinder injection valve 21, the intake passage injection valve 22, and the electronic control throttle valve to output, to these devices, an ignition period, the amount of fuel injection, a fuel injection period, the degree of throttle opening, and the like calculated based on the detection information from the various sensors.

The engine control unit 30 includes a mode determination unit 31 determining a fuel injection mode and an injection amount calculation unit 32 (injection amount control unit) calculating each of the amounts of fuel injection through the intake passage injection valve 22 and the cylinder injection valve 21. The injection amount calculation unit 32 further includes a direct-combustion-rate calculation unit 33 and a cylinder vaporization rate calculation unit 34.

The mode determination unit 31 calculates a load on the engine 1 from information such as the amount of accelerator operation and selects a fuel injection mode based on the load and an engine rotation speed detected by an engine rotation speed sensor 41. The fuel injection mode may be selected from an intake passage fuel injection mode in which the fuel is injected into the intake port 12 through the intake passage injection valve 22 (MPI mode), a cylinder fuel injection mode in which the fuel is injected into the cylinder through the cylinder injection valve 21 (DI mode), and an intake passage+cylinder fuel injection mode in which the fuel injection through the intake passage injection valve 22 and the fuel injection through the cylinder injection valve 21 are simultaneously provided (DI+MP mode). The MPI mode corresponds to a first injection mode according to the present invention, and the DI mode and the DI±MPI mode correspond to a second injection mode according to the present invention.

The mode determination unit 31 selects, for example, the DI mode for a high load region and the MPI mode for a low load region. In the low load region, where the MPI mode is implemented, the mode determination unit 31 further adds, for example, for a low-rotation low-load region, the cylinder fuel injection to select the DI+MPI mode in order to suppress an increase in the temperature of the high-pressure pump 25.

The injection amount calculation unit 32 calculates, based on the amount of accelerator operation and the like, the needed amount of fuel QF that is the amount of fuel combusted in the cylinder. The injection amount calculation unit 32 sets a direct injection rate Rdi that is the ratio of the amount of fuel injection Qdi through the cylinder injection valve 21 included in the total amount of fuel injection through the intake passage injection valve 22 and the cylinder injection valve 21 in the DI+MPI mode. That is, the amount of fuel injection Qdi through the cylinder injection valve 21 is denoted by $QF \times Rdi$, and the amount of fuel injection Qmpi through the intake passage injection valve 22 is denoted by $QF \times (1-Rdi)$. Rdi=0 in the MPI mode, and Rdi=1 in the DI mode.

The following description relates to an MPI injection model for calculation of the amount of fuel injection in the MPI mode and an MPI+DI injection model for calculation of the amount of fuel injection in the DI+MPI mode.

Figure 2:
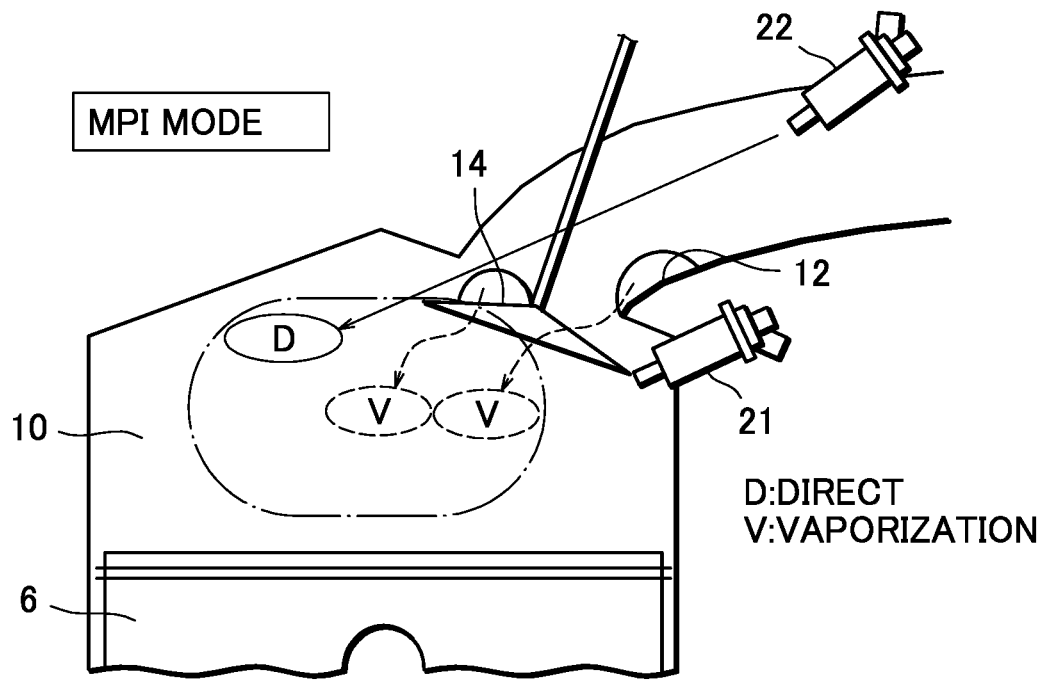
FIG. 2 is a schematic diagram illustrating a calculation method for the amount of fuel injection in an MPI mode.

FIG. 2 is a schematic diagram illustrating a calculation method for the amount of fuel injection in the MPI mode. (n) added to values in the following description is a value for the current combustion cycle. (n-1) is a value for the last combustion cycle.

As illustrated in FIG. 2, in the MPI mode, a portion of the fuel injected through the intake passage injection valve 22 flows directly into the cylinder, a portion of the fuel adheres to the intake port 12, and a portion of the fuel adheres to the intake valve 14. The portions of the fuel adhering to the intake port 12 and the intake valve 14 vaporize and flow into the cylinder (into the combustion chamber 10). That is, a portion of the fuel injected through the intake passage injection valve 22 is combusted during a combustion cycle corresponding to an injection period when the fuel flows directly into the cylinder, and a portion of the fuel is combusted during a combustion cycle after the injection period following adhesion to the intake port 12 and the intake valve 14.

When an MPI injection amount Fmpi(n) is defined as the amount of fuel injection through the intake passage injection valve 22 and a direct entrance rate $\alpha$ is defined as the rate of the amount of that portion of the fuel injected through the intake passage injection valve 22 which flows directly into the cylinder, $\alpha \times Fmpi(n)$ denotes the amount of that portion of the fuel injected through the intake passage injection valve 22 which flows directly into the cylinder. When the amount of fuel adhering to the intake port 12 is denoted as Rw(n) and the amount of fuel adhering to the intake valve 14 is denoted as Rv(n), a relationship $Fmpi(n) = \alpha \times Fmpi(n) + Rw(n) + Rv(n)$ is established.

When a wall portion vaporization rate Y is defined as the rate of that portion of the fuel adhering to the intake port 12 which vaporizes during one cycle and a valve portion vaporization rate X is defined as the rate of that portion of the fuel adhering to the intake valve 14 which vaporizes during one cycle, $Y \times Rw(n-1)$ denotes the amount of fuel vaporizing after adhesion to the intake port 12 and $X \times Rv(n-1)$ denotes the amount of fuel vaporizing after adhesion to the intake valve 14, the amounts being included in the last MPI injection amount Fmpi (n-1).

The amount of fuel contributing to combustion during the current combustion cycle is the sum of $\alpha \times Fmpi(n)$, which is a portion of the current MPI injection amount Fmpi(n), and $Y \times Rw(n-1)$ and $X \times Rv(n-1)$, which are a portion of the last MPI injection amount Fmpi(n-1), as illustrated by an alternate long and short dash line in FIG. 2. The engine control unit 30 may therefore adjust the current MPI injection amount Fmpi(n) so as to make the needed amount of fuel QF required for the engine 1 equal to the sum $\alpha \times Fmpi(n) + Y \times Rw(n-1) + X \times Rv(n-1)$.

Figure 3:
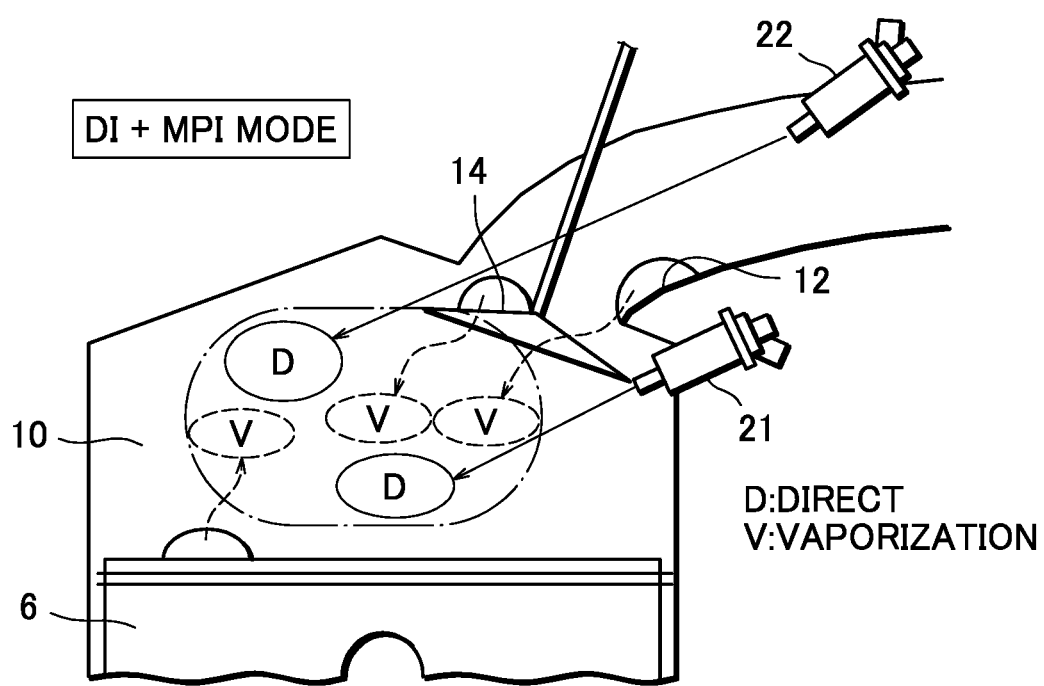
FIG. 3 is a schematic diagram illustrating a calculation method for the amount of fuel injection in a DI+MPI mode.

FIG. 3 is a schematic diagram illustrating a calculation method for the amount of fuel injection in the DI+MPI mode.

As illustrated in FIG. 3, the DI+MPI mode involves the fuel injection through the cylinder injection valve 21 in addition to the fuel injection in the MPI mode.

A portion of the fuel injected through the cylinder injection valve 21 flows directly into the cylinder, and a portion of the fuel adheres to the inside of the cylinder, for example, to an upper surface of the piston 6. The portion of the fuel adhering to the inside of the cylinder vaporizes to contribute to combustion. That is, a portion of the fuel injected through the cylinder injection valve 21 is directly combusted in the cylinder, and a portion of the fuel vaporizes and is combusted during a combustion cycle after adhesion to the inside of the cylinder.

When the amount of DI injection $Fdi(n)$ is defined as the amount of fuel injection through the cylinder injection valve 21 and a DI direct combustion rate $\alpha di$ (direct combustion rate) is defined as the rate of the amount of that portion of the fuel injected through the cylinder injection valve 21 which is directly combusted, $\alpha di \times Fdi(n)$ denotes the amount of a portion of the fuel injected through the cylinder injection valve 21 which is directly combusted. When the amount of fuel adhesion to the inside of the cylinder is denoted as $Rc(n)$, a relationship $Fdi(n) = \alpha di \times Fdi(n) + Rc(n)$ is established.

When a cylinder vaporization rate $Z$ is defined as the rate of that portion of the fuel adhering to the inside of the cylinder which vaporizes during one cycle, $Z \times RC(n-1)$ denotes the amount of fuel vaporizing after adhesion to the inside of the cylinder, the amount being included in the last amount of DI injection $Fdi(n-1)$.

The amount of fuel contributing to combustion during the current combustion cycle is the sum of $\alpha \times Fmpi(n) + Y \times Rw(n-1) + X \times Rv(n-1)$, described above for the MPI mode, and $\alpha di \times Fdi(n)$, which is a portion of the current amount of DI injection $Fdi(n)$, and $Z \times Rc(n-1)$, which is a portion of the last amount of DI injection $Fdi(n-1)$, as illustrated by an alternate long and short dash line in FIG. 3. The engine control unit 30 may therefore adjust the current amount of DI injection $Fdi(n)$ so as to make the needed amount of fuel QF required for the engine 1 equal to the sum $\alpha \times Fmpi(n) + Y \times Rw(n-1) + X \times Rv(n-1) + \alpha di \times Fdi(n) + Z \times Rc(n-1)$.

Figure 4:
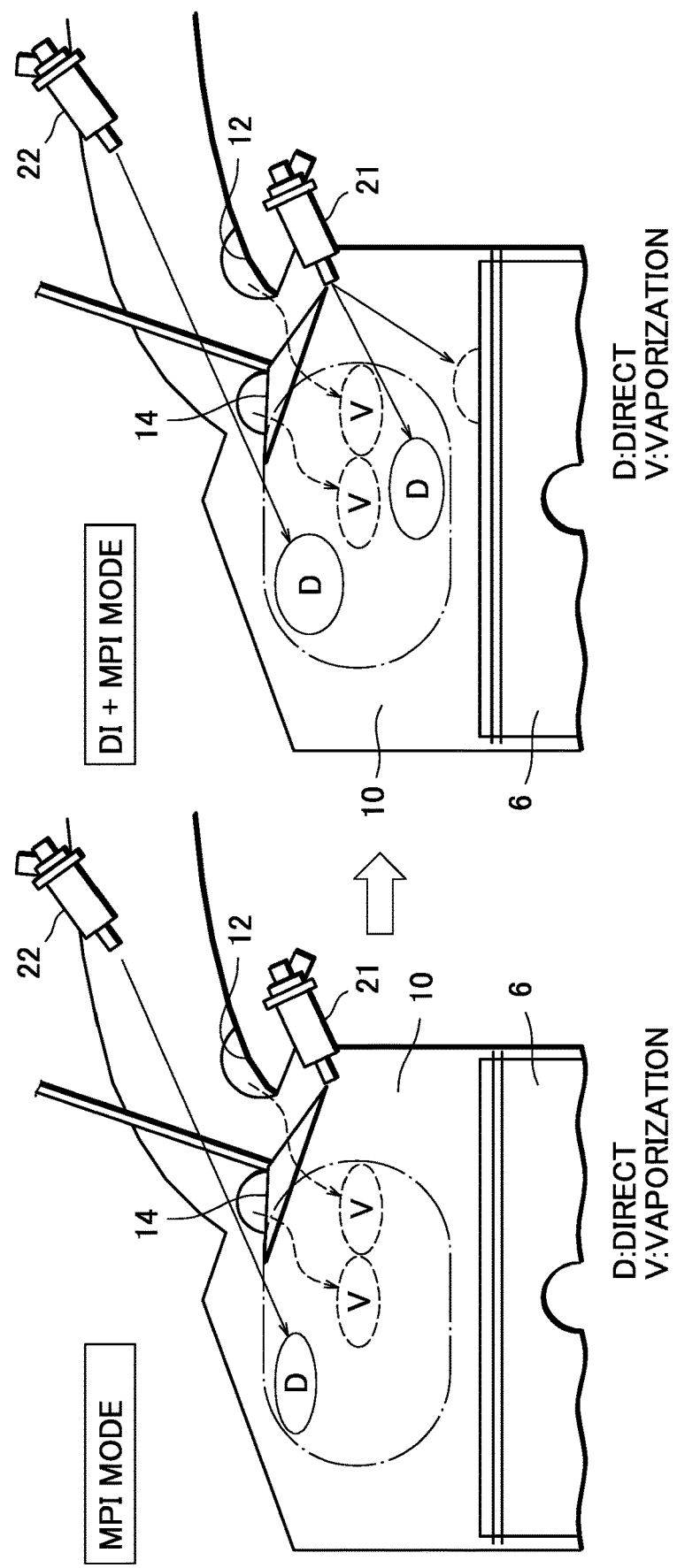
FIG. 4 is a schematic diagram illustrating a calculation method for the amount of fuel injection at the time of switching from the MPI mode to the DI+MPI mode.
Figure 5:
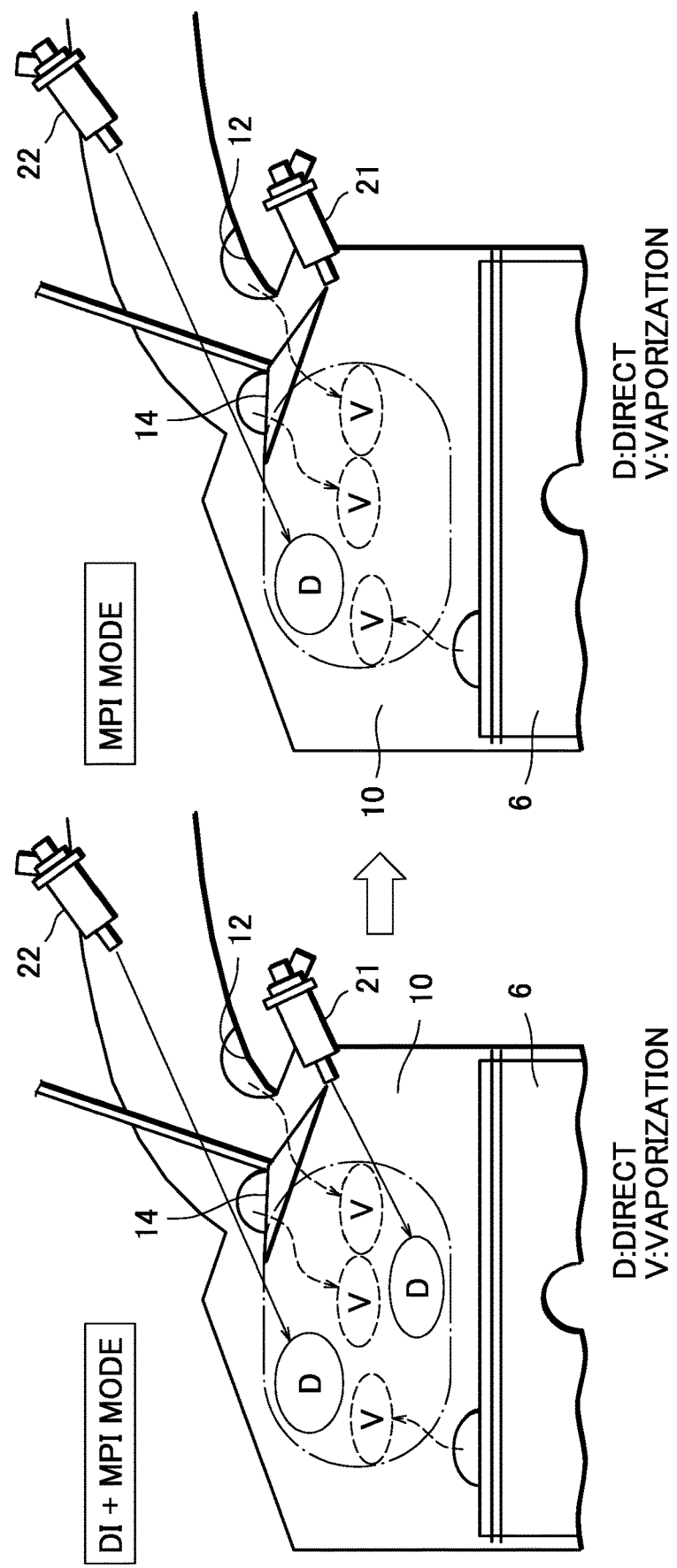
FIG. 5 is a schematic diagram illustrating a calculation method for the amount of fuel injection at the time of switching from the DI+MPI mode to the MPI mode.

FIG. 4 is a schematic diagram illustrating a calculation method for the amount of fuel injection at the time of switching from the MPI mode to the DI+MPI mode. FIG. 5 is a schematic diagram illustrating a calculation method for the amount of fuel injection at the time of switching from the DI+MPI mode to the MPI mode.

As illustrated in FIG. 4, no fuel adheres to the inside of the cylinder immediately after the MPI mode switches to the DI+MPI mode. Therefore, when the MPI mode switches to the DI+MPI mode, more of the fuel injected through the cylinder injection valve 21 adheres to the inside of the cylinder than in a case where the DI+MPI mode is maintained.

As illustrated in FIG. 5, the fuel adheres to the inside of the cylinder immediately after the DI+MPI mode switches to the MPI mode. The fuel adhering to the inside of the cylinder therefore vaporizes immediately after switching to the MPI mode.

The engine control unit 30 according to the present embodiment thus includes a counter that counts the number of ignitions (IGs) after switching from the MPI mode to the DI+MPI mode, to correct the DI direct combustion rate $\alpha di$ and the cylinder vaporization rate $Z$ at the time of mode switching.

Specifically, the cylinder vaporization rate calculation unit 34 multiplies the cylinder vaporization rate $Z$, used to calculate the amount of cylinder vaporization, by a cylinder vaporization rate correction coefficient $Xz$ to correct the cylinder vaporization rate $Z$. The cylinder vaporization rate calculation unit 34 calculates the cylinder vaporization rate $Z$ such that, for example, the cylinder vaporization rate $Z$ increases consistently with the temperature of cooling water detected by the water temperature sensor 4 or the engine rotation speed. The cylinder vaporization rate $Z$ is set to a value from 0 to 1. The cylinder vaporization rate correction coefficient $Xz$ is set, for example, to 1 for the DI mode or the DI+MPI mode and to a value larger than 1 for the MPI mode in the present invention. However, the cylinder vaporization rate $Z$ is limited so as not to exceed 1 even when the cylinder vaporization rate $Z$ is multiplied by the cylinder vaporization rate correction coefficient $Xz$ in the MPI mode.

The direct-combustion-rate calculation unit 33 multiplies, by a direct combustion rate correction coefficient $X\alpha di$, the DI direct combustion rate $\alpha di$, used to calculate the amount of that portion of the fuel injected through the cylinder injection valve 21 which is directly combusted, to correct the DI direct combustion rate $\alpha di$. The direct-combustion-rate calculation unit 33 calculates the DI direct combustion rate $\alpha di$ such that, for example, the DI direct combustion rate $\alpha di$ increases consistently with the temperature of cooling water detected by the water temperature sensor 4 or the engine rotation speed. The DI direct combustion rate $\alpha di$ is set to a value from 0 to 1. The DI direct combustion rate $\alpha di$ also varies according to a fuel injection timing of the cylinder injection valve 21, that is, a piston position. The direct combustion rate correction coefficient $X\alpha di$ is set to 1 for the DI mode or the Di+MPI mode and to a value smaller than 1 (approximately 0) for the MPI mode.

Figure 6:
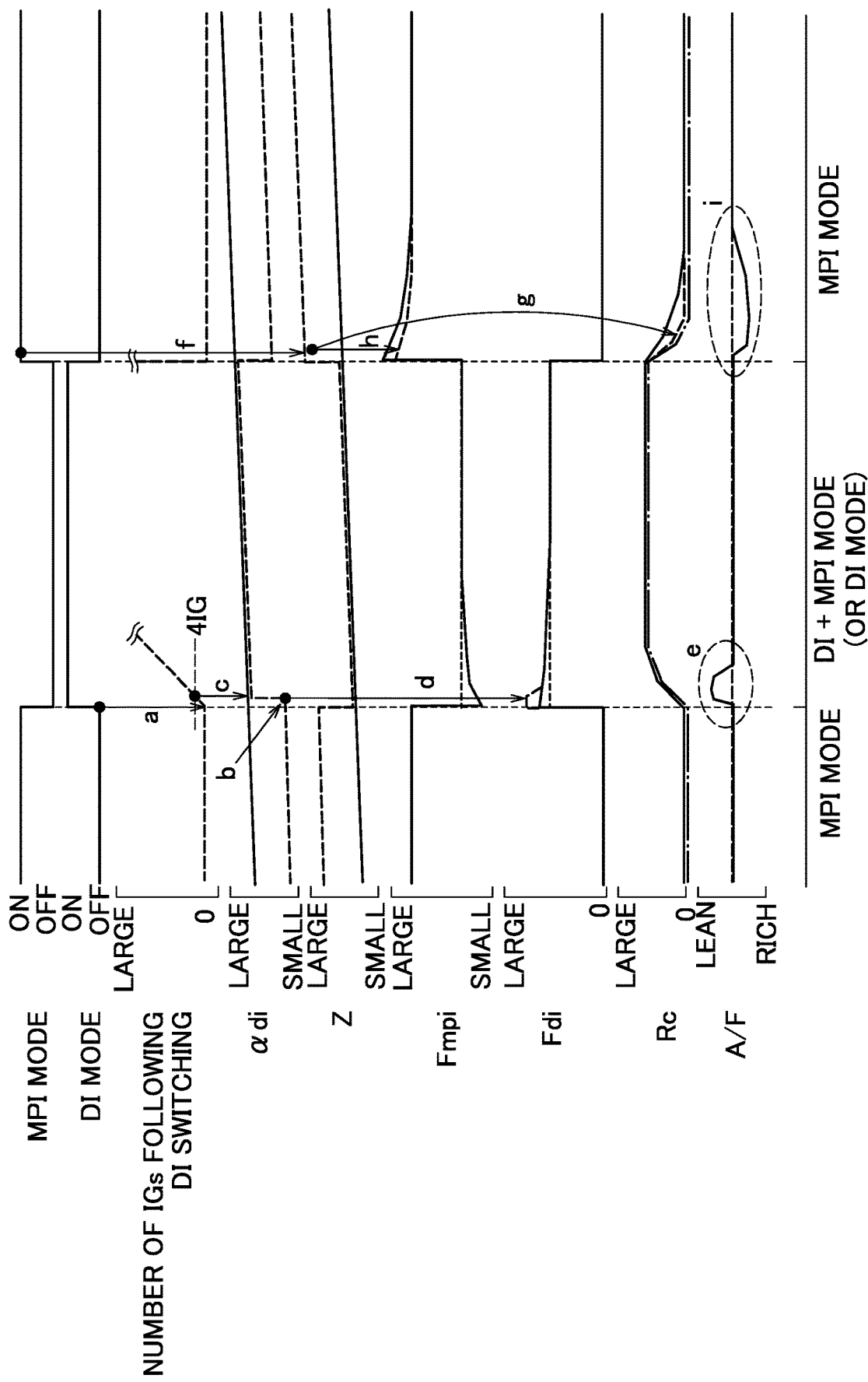
FIG. 6 is an example of a time chart illustrating transitions of various parameters in cases where a fuel injection mode is switched.

FIG. 6 is a time chart illustrating an example of transitions of various parameters in cases where the fuel injection mode is switched. FIG. 6 illustrates an example of transitions of the DI direct combustion rate $\alpha di$, the cylinder vaporization rate $Z$, the MPI injection amount $Fmpi$, the amount of DI injection $Fdi$, the amount of cylinder adhesion $Rc$, and a cylinder air-fuel ratio A/F in cases where the MPI mode switches to the DI+MPI mode, which is then switched back to the MPI mode, based on an operating state of the engine.

FIG. 6 is used to describe below differences between the present embodiment and a referential example in which the cylinder vaporization rate $Z$ and the DI direct combustion rate $\alpha di$ are not corrected, that is, the cylinder vaporization rate correction coefficient $Xz$ and the direct combustion rate correction coefficient $X\alpha di$ are constantly 1, in connection with the transitions of the parameters in cases where the MPI mode switches to the DI+MPI mode, which is then switched back to the MPI mode, based on an operating state of the engine.

In FIG. 6, solid lines indicate transitions in the referential example, in which the cylinder vaporization rate $Z$ and the DI direct combustion rate $\alpha di$ are not corrected, and dashed lines indicate transitions in the present embodiment, in which the cylinder vaporization rate $Z$ and the DI direct combustion rate $\alpha di$ are corrected.

The cylinder vaporization rate $Z$, for example, increases constantly with the cylinder temperature with progression of operation, and thus, in the referential example, gradually increases with the cylinder temperature regardless of whether the engine is in the MPI mode or the DI+MPI mode.

In the present embodiment, the cylinder vaporization rate $Z$ in the MPI mode is multiplied by a cylinder vaporization rate correction coefficient $Xz$ of larger than 1. The amount of cylinder vaporization is thus larger than that in the referential example.

In the present embodiment, in the MPI mode, the DI direct combustion rate $\alpha di$ is multiplied by the direct combustion rate correction coefficient $X\alpha di$ to reflect the direct combustion rate correction coefficient $X\alpha di$ in the DI direct combustion rate $\alpha di$. That DI direct combustion rate $\alpha di$ is thus substantially smaller than that in the referential example. In the case where the MPI mode is maintained, the MPI injection amount Fmpi, the amount of DI injection Fdi, and the amount of cylinder adhesion Rc transition in the same manners both in the referential example and in the present embodiment.

The MPI mode is then switched to the DI+MPI mode to count up, from 0, the number of IGs following DI switching (a in FIG. 6).

In the present embodiment, during the first fuel injection in each cylinder following switching to the DI+MPI mode, the DI direct combustion rate $\alpha di$ is multiplied by a direct combustion rate correction coefficient $X\alpha di$ of smaller than 1 and thus kept small as in the case of the MPI mode (b in FIG. 6).

When the first fuel injection following DI switching ends in each cylinder (for four-cylinder engine, the number of IGs reaches 4), the direct combustion rate correction coefficient $X\alpha di$ is set to 1 to end the correction of the direct combustion rate (c in FIG. 6). The first fuel injection, that is, one fuel injection, corresponds to a predetermined number of injections according to the present invention.

During the first fuel injection following DI+MPI mode switching, the DI direct combustion rate $\alpha di$ is multiplied by a direct combustion rate correction coefficient $X\alpha di$ of smaller than 1 and thus kept small, reducing the amount $\alpha di \times Fdi$ of that portion of the fuel injected through the cylinder injection valve 21 which is directly combusted. The amount of DI injection Fdi(n) is thus increased to compensate for the reduction (d in FIG. 6).

Although switching to the DI+MPI mode reduces the MPI fuel amount and increases the DI fuel amount, in the referential example, the cylinder air-fuel ratio is temporarily turned lean during the first combustion immediately after DI switching. This is because the amount of DI fuel is consumed to generate a liquid film in the cylinder where the fuel contains no liquid film when the state of continuous combustion in the MPI mode switches to the DI+MPI mode.

In the present embodiment, during the first fuel injection following DI+MPI mode switching, the direct combustion rate correction coefficient $X\alpha di$ is reflected in the DI direct combustion rate $\alpha di$ to reduce the DI direct combustion rate $\alpha di$. This increases the DI fuel amount Fdi to prevent the cylinder air-fuel ratio from turning lean immediately after the Di+MPI mode switching, allowing the desired cylinder air-fuel ratio A/F to be maintained (e in FIG. 6).

In the present embodiment, when the DI+MPI mode is then switched to the MPI mode, the cylinder vaporization rate Z is multiplied by a cylinder vaporization rate correction coefficient Xz of larger than 1 for correction and thus set higher than in the referential example, in which the cylinder vaporization rate correction coefficient Xz is fixed to 1 (f in FIG. 6).

In the present embodiment, the cylinder vaporization rate Z increases in the MPI mode, and thus, a large amount of fuel $Z \times Rc(n-1)$ is estimated to vaporize from inside the cylinder, and the amount of cylinder adhesion Rc is estimated to decrease significantly. When the DI+MPI mode switches to the MPI mode, the cylinder temperature increases, thus allowing the actual amount of cylinder adhesion, illustrated by an alternate long and short dash line in FIG. 6, to transition in substantially the same manner as the amount of cylinder adhesion Rc estimated according to the present embodiment (g in FIG. 6).

In the present embodiment, the cylinder vaporization rate Z increases in the MRI mode. Thus, when the DI+MPI mode switches to the MPI mode, the amount of fuel vaporizing from inside the cylinder is estimated to also increase, and the MPI injection amount Fmpi is reduced (h in FIG. 6).

In the referential example, the cylinder air-fuel ratio turns rich immediately after the DI+MPI mode switches to the MPI mode. This is because the MPI mode lacks the fuel injection into the cylinder and thus leads to a higher cylinder temperature than the DI+MPI mode. This phenomenon occurs when the DI+MPI mode switches to the MPI mode to increase the cylinder temperature and thus the actual cylinder vaporization rate Z, causing a large amount of the fuel adhering to the inside of the cylinder to vaporize in the DI+MPI mode. The increase in cylinder vaporization rate lasts, for example, for several combustion cycles until the actual amount of cylinder adhesion becomes 0.

In the present embodiment, the cylinder vaporization rate Z is set to a large value for the MPI mode to reduce the MPI injection amount Fmpi immediately after switching from the DI+MPI mode to the MPI mode. This prevents the cylinder air-fuel ratio from turning rich immediately after the switching, allowing the desired cylinder air-fuel ratio to be set (i in FIG. 6).

If the DI+MPI mode switches to the MPI mode, which immediately returns to the DI+MPI mode, the DI direct combustion rate $\alpha di$ may be restrained from decreasing immediately after the MPI mode switches to the DI+MPI mode. Specifically, if the MPI mode switches to the DI+MPI mode within a predetermined number of cycles after the DI+MPI mode switches to the MPI mode (several combustion cycles before the amount of cylinder adhesion becomes 0), the direct combustion rate correction coefficient $X\alpha di$ may be set to 1 or a value from 1 to a value larger than the direct combustion rate correction coefficient $X\alpha di$ set immediately after the MPI mode switches to the DI+MPI mode.

Thus, when immediate switching occurs in order of the DI+MPI mode, the MPI mode, and the DI+MPI mode, the fuel adheres to the inside of the cylinder preventing the cylinder temperature from becoming higher than that in the case where the MPI mode is maintained. In this case, when the DI direct combustion rate $\alpha di$ is reduced to increase amount of DI injection Fdi as in the case where the MPI mode switches to the DI+MPI mode as described above, the cylinder air-fuel ratio A/F excessively decreases (turns rich). The direct combustion rate correction coefficient $X\alpha di$ is thus set to a large value to increase the DI direct combustion rate $\alpha di$, as described above. This suppresses an excessive increase in amount of DI injection Fdi, allowing restraint of an excessive decrease in the cylinder air-fuel ratio A/F.

The embodiment of the present invention has been described. However, the present invention is not limited to the present embodiment.

For example, the control during switching between the DI+MPI mode and the MPI mode has been described in the embodiment. However, similar control may be performed for switching between the DI mode and the MPI mode. That is, the above-described control may be performed for switching between a DI-available mode and a DI-unavailable mode. Alternatively, similar control may be performed in a case where the rate of the amount of DI injection has significantly changed.

What is claimed is:

1. A fuel injection control apparatus for an internal combustion engine comprising:
   a first fuel injection valve injecting a fuel into an intake passage of the internal combustion engine, a second fuel injection valve injecting the fuel into a cylinder of the internal combustion engine, and an injection amount control unit setting a ratio between an amount of fuel injection through the first fuel injection valve and an amount of fuel injection through the second fuel injection valve based on an operating state of the internal combustion engine to control the amounts of fuel injection through the first fuel injection valve and the second fuel injection valve, wherein the injection amount control unit includes:

a direct-combustion-rate calculation unit calculating a direct combustion rate that is a rate of an amount of that portion of the fuel injected through the second fuel injection valve which is combusted in the cylinder instead of adhering to the inside of the cylinder, and a cylinder vaporization rate calculation unit calculating a cylinder vaporization rate that is a rate of an amount of that portion of the fuel adhering to the inside of the cylinder which vaporizes, and the injection amount control unit sets the amount of fuel injection through the first fuel injection valve and the amount of fuel injection through the second fuel injection valve based at least on the direct combustion rate and the cylinder vaporization rate, and the injection amount control unit corrects the direct combustion rate or the cylinder vaporization rate to set the amount of fuel injection through the first fuel injection valve or the amount of fuel injection through the second fuel injection valve when the ratio between the amount of fuel injection through the first fuel injection valve and the amount of fuel injection through the second fuel injection valve is changed, wherein the injection amount control unit switches from a first injection mode in which the fuel is injected into the intake passage through the first fuel injection valve to a second injection mode in which the fuel is injected into the cylinder through the second fuel injection valve to change the ratio between the amount of fuel injection through the first fuel injection valve and the amount of fuel injection through the second fuel injection valve, and wherein the injection amount control unit increases and maintains the amount of fuel injection through the second fuel injection valve at the increased amount for a predetermined period of time from when the first injection mode is switched to the second injection mode compared to the amount of fuel injection through the second fuel injection valve after the predetermined period of time has elapsed.

2. The fuel injection control apparatus for an internal combustion engine according to claim 1, wherein the amount of fuel injection through the second fuel injection valve is increased for the predetermined period of time by correcting and setting, by the direct-combustion-rate calculation unit the direct combustion rate lower for the predetermined period of time from when the first injection mode is switched to the second injection mode and corrects and sets the direct combustion rate higher after the predetermined period of time has elapsed.

3. The fuel injection control apparatus for an internal combustion engine according to claim 1, wherein the cylinder vaporization rate calculation unit corrects and sets the cylinder vaporization rate to a value larger than a value set for the second injection mode when the second injection mode switches to the first injection mode based on the operating state of the internal combustion engine, and the injection amount control unit reduces the amount of fuel injection through the first fuel injection valve according to the increased cylinder vaporization rate until a predetermined number of injections are provided immediately after switching from the second injection mode to the first injection mode.

4. The fuel injection control apparatus for an internal combustion engine according to claim 2, wherein the cylinder vaporization rate calculation unit corrects and sets the cylinder vaporization rate to a value larger than a value set for the second injection mode when the second injection mode switches to the first injection mode based on the operating state of the internal combustion engine, and the injection amount control unit reduces the amount of fuel injection through the first fuel injection valve according to the increased cylinder vaporization rate until the predetermined number of injections are provided immediately after switching from the second injection mode to the first injection mode.

5. The fuel injection control apparatus for an internal combustion engine according to claim 2, wherein the direct-combustion-rate calculation unit corrects and sets the direct combustion rate higher in a case where, after switching from the second injection mode to the first injection mode, the first injection mode switches to the second injection mode before a predetermined number of combustion cycles pass, than in a case where, after switching from the second injection mode to the first injection mode, the first injection mode switches to the second injection mode after the predetermined number of combustion cycles or more have passed.

* * * * *